March 31, 1936. A. F. PIEPER 2,036,097
COUNTERBALANCED SUPPORTING MECHANISM
Filed Nov. 10, 1932 3 Sheets-Sheet 1
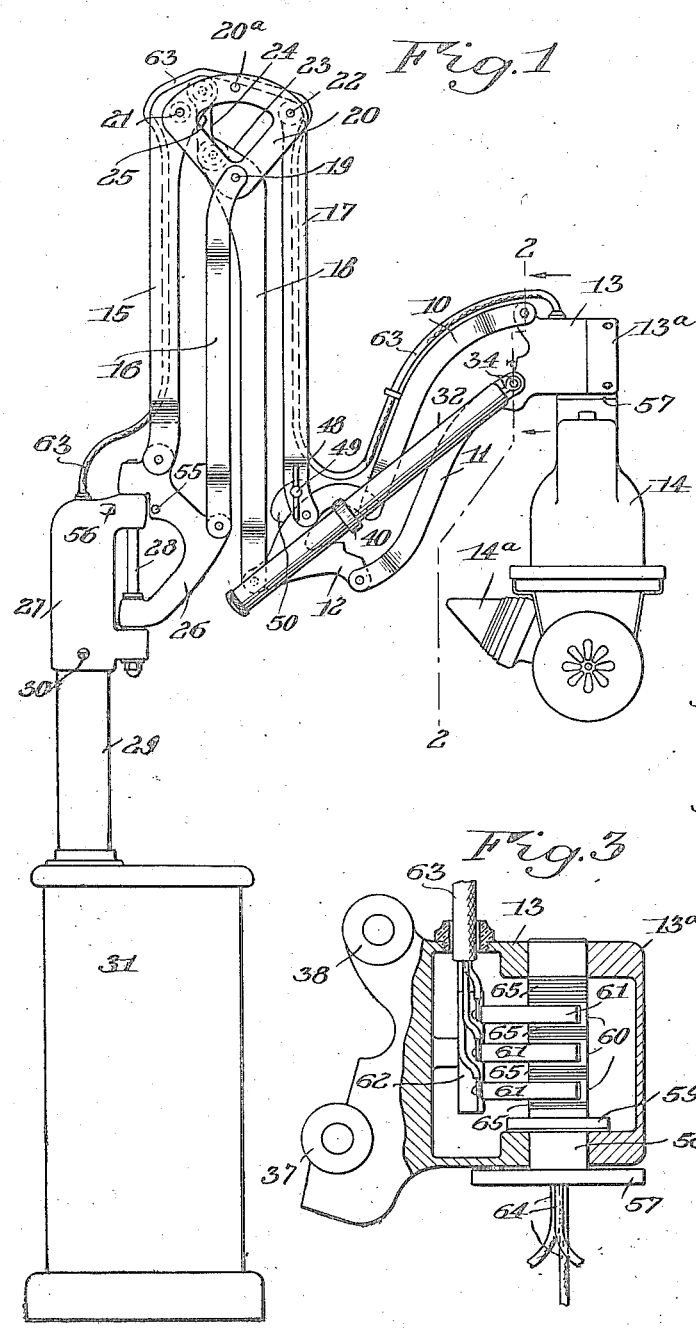
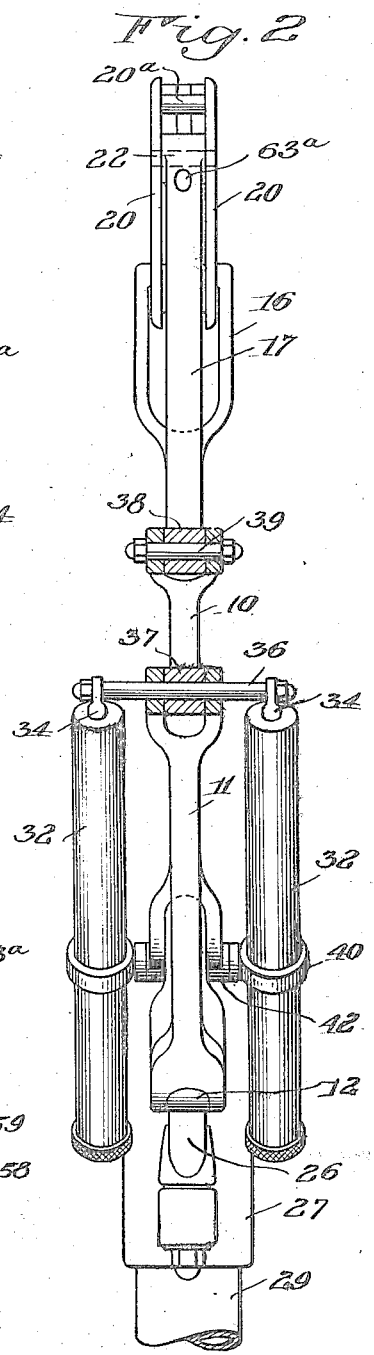
INVENTOR
Alphonse F. Pieper
BY Edward H. Cumpston
his ATTORNEY

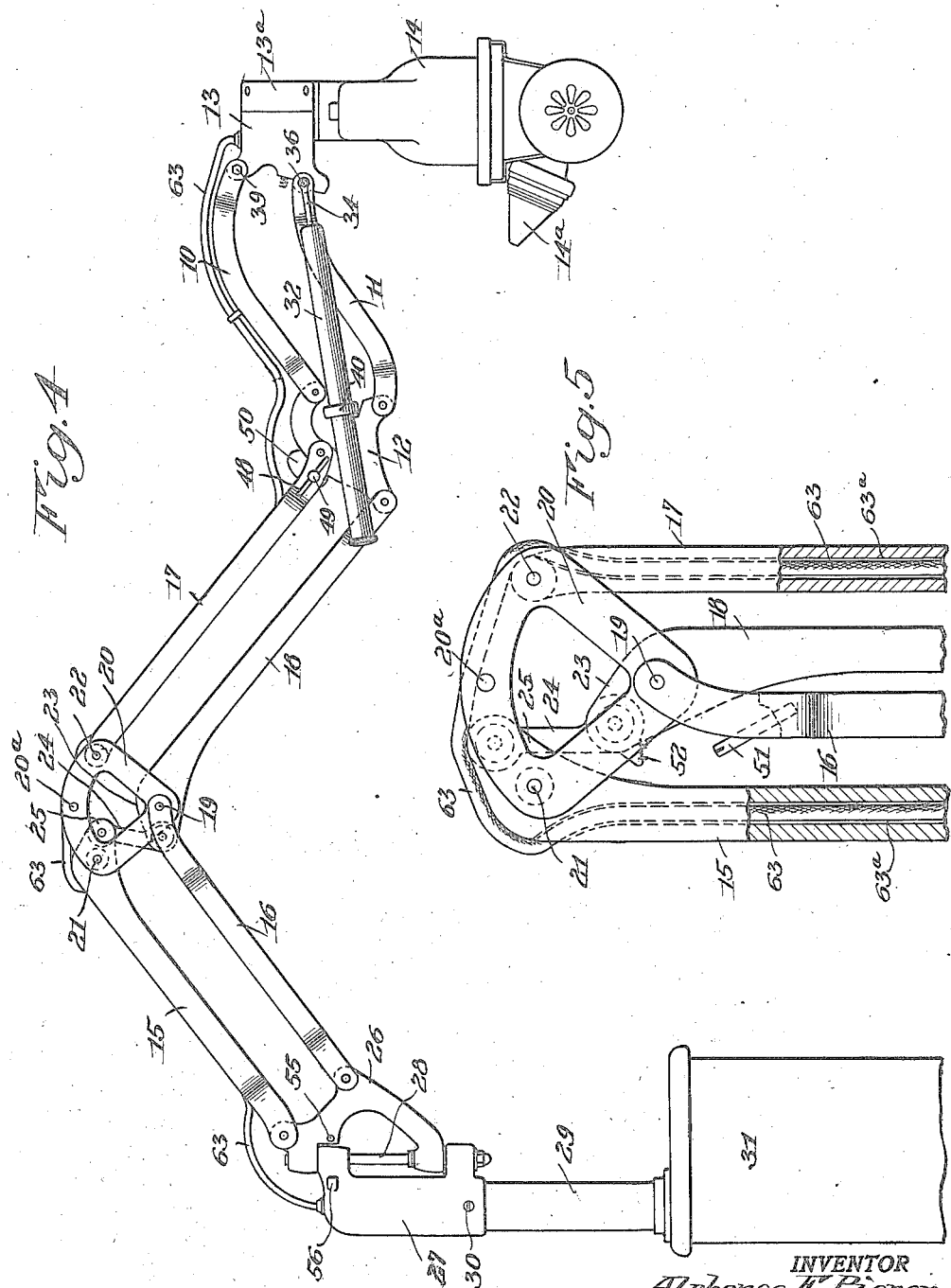

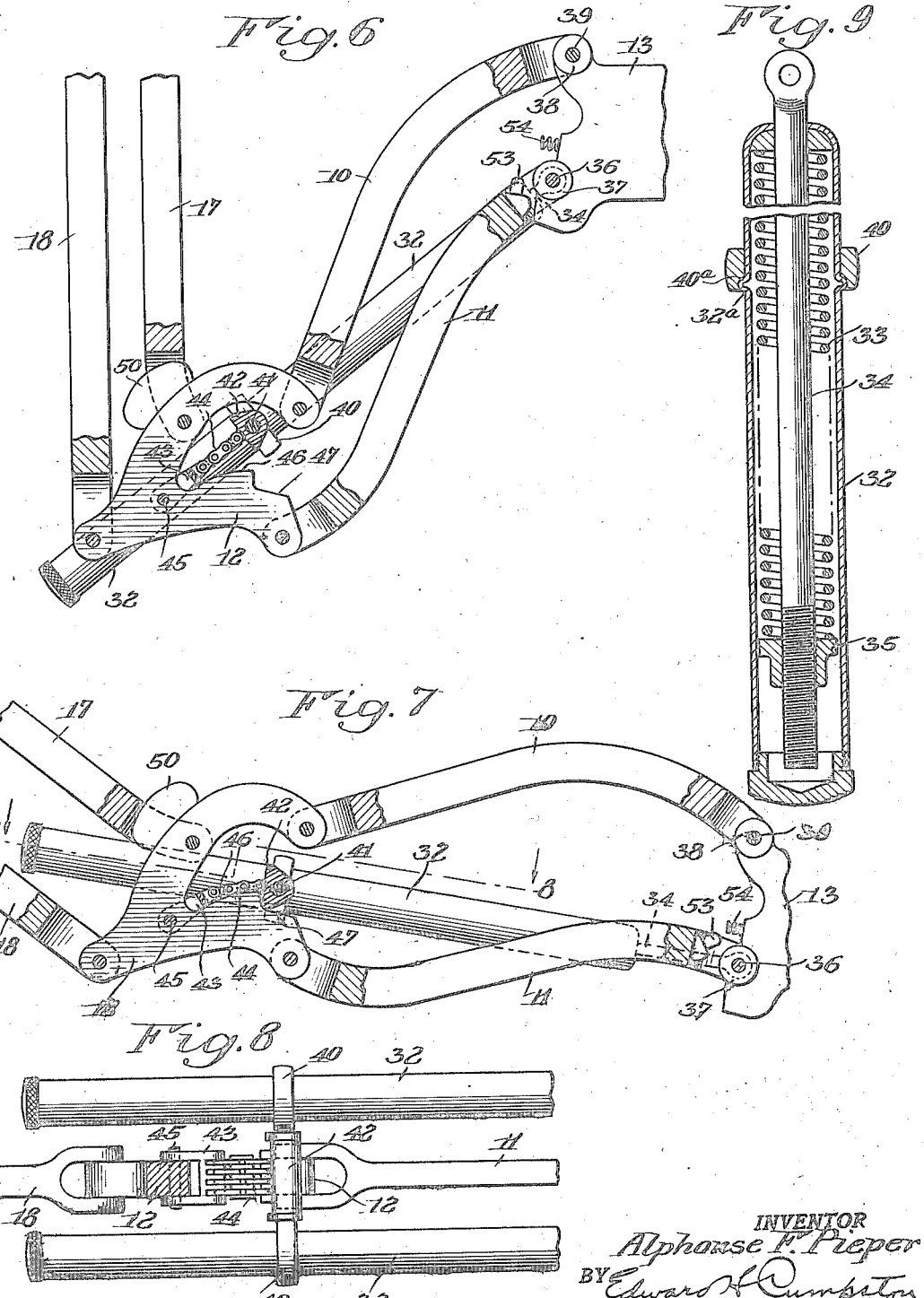

Patented Mar. 31, 1936

2,036,097

UNITED STATES PATENT OFFICE 2,036,097

COUNTERBALANCED SUPPORTING MECHANISM

Alphonse F. Pieper, Rochester, N. Y.

Application November 10, 1932, Serial No. 642,043

27 Claims. (Cl. 250—34)

The present invention relates to counterbalanced mechanism for supporting various objects or devices in different positions to facilitate operation or usage of the same, and has for its object to provide an improved device of this class designed to insure ease in operation and stability in service.

A further object of the invention is to provide a parallel motion linkage for supporting various objects, having resilient counterbalancing means operated by movement of the linkage to vary the force or resistance of the resilient means in proportion to the varying torque of the linkage in the different positions thereof.

A further object of the invention is to provide a parallel motion linkage for supporting different objects having resilient counterbalancing means arranged upon movement of the linkage from one position to another to swing about different centers whereby to variably control the force or resistance of the counterbalancing means to compensate for the varying torque of the parallel motion linkage.

A further object of the invention is to provide a parallel motion linkage mechanism for supporting various objects, having resilient counterbalancing mechanism angularly disposed with respect to the linkage and operated by movement of the latter to change the angular relationship of said mechanisms whereby to compensate for the difference in torque of the linkage in the different positions thereof.

A further object of the invention is to provide in combination with a counterbalanced supporting mechanism and an X-ray apparatus, an improved mounting for rotatably supporting the apparatus in the different positions to which it may be adjusted and also serving as means for closing the circuit for supplying current to the X-ray apparatus in its different positions.

A further object of the invention is to provide in combination with parallel motion linkage having locking means for securing it in different positions, a counterbalanced object supporting extension adjustable on the linkage to support various objects in different positions.

To these and other ends the invention resides in certain improvements and combinations of parts, all as will be hereinafter more fully described, the novel features being pointed out in the claims at the end of the specification.

In the drawings:

Fig. 1 is a view in elevation embodying one form of the invention;

Fig. 2 is a sectional elevation drawn to an enlarged scale and taken on line 2—2 of Fig. 1;

Fig. 3 is a sectional elevation illustrating the means for supporting the X-ray apparatus and showing the manner of making the electrical connections through which current is supplied to the tube and transformer;

Fig. 4 is a side elevation showing the bracket in extended position;

Fig. 5 is a part sectional elevation drawn to an enlarged scale and illustrating the manner of supporting the circuit connections for the tube on the links of the bracket;

Fig. 6 is a fragmentary sectional elevation of that portion of the linkage with which the counterbalancing means is associated;

Fig. 7 is a similar view showing the linkage adjusted to a different position;

Fig. 8 is a sectional plan taken approximately on line 8—8 of Fig. 7, and

Fig. 9 is a section taken longitudinally through one of the spring housings of the counterbalancing mechanism.

The combined parallel motion linkage and counterbalancing means shown in the drawings may be employed as an adjustable supporting mechanism for various objects, one of which is shown by way of example as an X-ray apparatus intended for use by dentists and others in making radiographs.

The outer or object supporting section of the bracket may be in the form of an arm or other suitable supporting device movable to different positions but preferably comprises a pair of upper and lower links 10 and 11 having inner and outer connecting members 12 and 13 respectively. The member 13 is designed to receive and support the object, which in the present instance is the X-ray apparatus, comprising the usual tube or bulb, the high tension transformer, and other parts enclosed within a suitable housing 14 arranged to rotate upon the member 13 about a vertical axis in a manner described hereinafter, the cone or portion through which the rays are projected being indicated at 14a.

The inner section of the bracket comprises two sets of links, the inner or main set designated by the reference characters 15 and 16, and the outer set by the reference characters 17 and 18, the links of the outer set being pivotally connected with the member 12 which supports the links 10 and 11 and the parts connected therewith. The links 16 and 18 have a common pivotal center 19 on a pair of spaced supporting members 20 upon which the links 15 and 17 are also pivoted at the points 21 and 22, respectively, the members 20 having one or more connecting parts 20a therebetween. The link 18 is extended above the pivot 19 to afford a short arm 23 with which is pivotally connected a short link 24, the upper end of which is pivotally connected with an arm 25 on the link 15. The short link 24 functions in the usual manner to maintain the parallel relation between the links of the inner and outer sets 15—16 and 17—18, respectively, as well understood in the art.

The inner or main links 15 and 16 are pivotally connected with a member 26 supported by a part 27 and arranged to swing thereon about the axis of a vertically disposed pivot member 28 as shown in Figs. 1 and 4. The member 27 is preferably sleeved upon a tubular support 29 and is held against turning thereon by one or more screws 30. The tubular support 29 is extended upwardly from a suitable base 31 preferably comprising a cabinet for receiving various parts, not shown, having to do with the control and operation of the X-ray apparatus.

The improved counterbalancing means is best indicated in Figs. 6 to 9 inclusive, and is associated with the outer section of the linkage comprising the parallel links 10 and 11 and the connecting parts 12 and 13 therefor.

The parallel motion linkage shown in Figs. 6 and 7 has associated therewith compensating means for automatically varying the tension on the spring means to take care of the difference in torque resulting from an increase or decrease in the leverage of the linkage when moving it to different positions. This is accomplished in the present instance by changing the angular relationship between the linkage and the counterbalancing means during movement of the linkage to different positions of adjustment, as by a lateral movement of the spring holding means or by moving it transversely of the direction of movement of the parts for tensioning the spring means as described hereinafter.

The preferred method of accomplishing this result is by mounting the compensating means in a manner to cause it to progressively swing about different pivotal centers during adjustment of the linkage to different positions in a vertical plane whereby the varying angular relationship between the linkage and the compensating means thus produced results in varying the tension of the spring means in proportion to the torque of the linkage when the leverage of the latter is changing by reason of its movement from one position to another.

The counterbalancing means comprises a pair of tubular members 32 disposed at the opposite sides of the links 10 and 11 and forming holding means for the springs 33 therein. Tensioning rods or members 34 are extended through the springs and provided with nuts 35 adjustable to vary the tension of the springs. The outer ends of the rods are connected with a pin 36 extending through the jaws of the lower link 11 and through a lug 37 on the object supporting member 13 as best shown in Fig. 2, the pin forming the pivotal connection between the link 11 and said member. A similar lug 38 at the upper side of the member 13 forms a bearing for a pivot pin 39 with which the jaws of the link 10 are connected, as shown in Fig. 2. The spring holding tubes 32 are provided with collars 40 which have inwardly extending pivot members 41 journaled in a bearing 42 disposed transversely of the tubes 32, as best shown in Figs. 2 and 8.

A flexible connection comprising a yoke 43 and a chain 44 is interposed between the supporting member 12 and the bearing 42, the yoke being pivotally connected at 45 with the member 12 and the chain with the bearing 42. The collars 40 are recessed at 40a to receive the annular shoulders 32a on the tubes 32, the pressure of the springs normally maintaining the shoulders in engagement with the collars which exert a pull on the chain to tension the latter in all positions of the linkage.

The supporting member 12 is provided with a cam 46 about which the chain is wrapped when the links 10 and 11 are swung downwardly from the elevated position shown in Fig. 6 to the substantially horizontal position shown in Fig. 7. When moving the links downwardly in a vertical plane the spring holding tubes 32 will be swung about the different pivotal centers of the chain. For example in the initial downward movement of the tubes they are caused to swing about the axis of the pivot pin 45 of the yoke 43. As soon as the yoke moves into contact with and is arrested by the cam 46, the movement of the tubes will be about the axis of the first set of links at its point of connection with the yoke, after which the different sets of links are progressively arrested by the cam thus insuring pivotal movement of the spring holding tubes about different centers until the bearing 42 is moved into engagement with the shoulder 47 of the member 12 as shown in Fig. 7, after which the pivotal center of the tube becomes fixed.

It will be seen, therefore, that in this movement of the tubes the various axes about which they are progressively swung constantly shorten the radii of the tubes until the bearing 42 is arrested by the stop 47, thus progressively varying the angular relationship of the tubes with respect to the link 11. In other words the distance from the outer ends of the tubes 32 to the different axes about which they swing is varied for the purpose of varying the tension on the springs to compensate for the increase in pressure thereon in order to take care of the difference in torque resulting from an increase in the leverage of the linkage when moving downwardly between the positions shown in Figs. 6 and 7.

The effect of moving the chain in contact with the cam is therefore to retract the tubes when the linkage is moving downwardly to the position shown in Fig. 7, thus increasing the tension on the springs by gradually moving the tubes rearwardly while moving the rods 34 outwardly. This action serves to increase the tension on the springs to compensate for the increase in pressure due to the increase of the leverage of the linkage. This obviously would not be the case if the tubes were moved about a fixed pivot since with such an arrangement there would be no compensating effect.

In moving the linkage and changing the centers about which the spring holding tubes are swung a smooth and even counterbalancing effect is afforded regardless of the direction of movement of the linkage in the plane in which it is operated and it will remain in any position at which it is released without vibration or oscillation to any appreciable extent.

The linkage can, of course, be moved to different positions below the substantially horizontal position shown in Fig. 7 if desired, in which different positions it will be held by the counterbalancing means. In this case it will swing about the pivot 41 which is held by reason of the fact that the bearing 42 is in contact with the shoulder 47 on the linkage supporting member 12.

The inner and intermediate sections of the linkage which support the outer object-holding section can be locked in any position to which they may be adjusted by turning the handle 48 of the clamping screw 49 extended through one of the jaws of the link 17 for engagement with a lug 50 disposed between the jaws and suitably anchored upon the supporting member 12.

Although the inner and intermediate sections of the linkage 15—16 and 17—18, respectively, may be secured against relative movement in fully extended position or at different intermediate positions by tightening the clamping screw 49, means has been provided which may be applied and removed when desired which will serve to limit the extension of the linkage to a predetermined or selected position at which it may be found desirable to operate the X-ray apparatus or other device carried by the linkage. This means preferably comprises a screw 51 affording a removable stop applied between the jaws of the link 16 in Fig. 5 in position to be engaged by a lug 52 on the arm 23 of the link 18.

Limitation of the downward movement of the outer section of the linkage comprising the parallel members 10 and 11 is also provided for. In this case the downward movement of said section is limited by engagement of a lug 53 extending between the jaws of the link 11 with a spring 54 anchored within a recess formed in the holder 13 upon which the object is mounted when the linkage is moved to a predetermined position below that shown in Fig. 7.

The movement of the linkage about the axis of the vertical pivot member 28 is limited by engagement of the projections 55 on the opposite sides of the support 26 with stop lugs 56 on the opposite sides of the sleeve 27, shown in Figs. 1 and 4. Thus the object supported by the bracket may be moved in both vertical and horizontal planes whereby it may be adjusted to various operating or service positions.

The means for supporting the housing for the X-ray apparatus upon the holder or mounting 13, which connects the outer ends of the links 10 and 11, comprises a plate 57 with which the housing is suitably connected, the plate being fixed on the lower end of a hollow rotary member 58 having its end portions journaled in the upper and lower walls of the holder. A thrust bearing 59 on the rotary member seated upon the lower wall of the holder as shown in Fig. 3, serves to support the X-ray apparatus for rotation about a vertical axis.

The rotary member 58 is provided with a plurality of metal contact rings 60 which are constantly engaged by the fixed contacts 61 carried by a support 62 suitably secured within the holder. The circuit wires for supplying current to the transformer and tube within the housing 14 are extended from the control cabinet 31 through a flexible tube or covering 63 and connected with the contacts 61, the circuit being completed through the rings 60 and the wires 64 extending from the transformer into the rotary member 58 and connected therein with the rings. The rings are separated by suitable insulating members 65 as shown in Fig. 3. The holder 13 containing the fixed and movable contacts is formed in two parts, the outer part 13a being detachable to permit the rotary supporting member 58 and associated parts to be properly assembled within the holder.

The flexible tube or covering 63 containing the circuit wires leading to the holder 13 is carried through suitable channelways or passages 63a formed in the links 15 and 17 and is extended over the link 10 and through the upper wall of the holder 13 as shown in Fig. 4.

I claim:

1. A counterbalanced supporting mechanism, comprising a supporting part, an object supporting device connected with said supporting part for movement to different positions, resilient counterbalancing means connected at one end to said supporting device for operation by movement thereof, a member associated with said supporting part, and a flexible connection between the counterbalancing means and the supporting part arranged to move upon said member during movement of the supporting device whereby to effect lateral shifting of said counterbalancing means to vary the tension of the latter in proportion to the torque of the supporting device in the different positions thereof.

2. A counterbalanced supporting mechanism, comprising a supporting part, an object supporting device connected with and movable to different positions upon said supporting part, resilient counterbalancing means connected with said supporting device for operation thereby, an element associated with said supporting part, and a device connecting the resilient counterbalancing means with the supporting part comprising a plurality of pivotally connected members progressively moving into engagement with said element and pivoting one upon another during movement of the object supporting device between predetermined positions whereby the counterbalancing means is tensioned in proportion to the torque of the object supporting device.

3. A counterbalanced supporting mechanism, comprising a supporting part, an object supporting device movable to different positions upon said part, resilient counterbalancing means connected with said supporting device for tensioning by movement thereof, a cam associated with said part, and means connecting the counterbalancing means with the supporting part adapted to move in engagement with the cam to change the angular relationship between the object supporting device and the counterbalancing means while the latter is being tensioned by movement of the supporting device whereby to compensate for the varying torque of the supporting device in the different positions thereof.

4. A counterbalanced supporting mechanism comprising a supporting part, an object supporting device movable to different positions upon said supporting part, resilient counterbalancing means connected with the supporting device for operation by movement thereof, a flexible connection having one end secured upon said supporting part, pivot means interposed between the opposite end of the connection and the counterbalancing means, the pivot means upon movement of the supporting device in one direction being moved by the connection to a predetermined position, and means for arresting the pivot means when the counterbalancing means is moved to said position, the pivot means when arrested serving as a pivotal support for the counterbaalncing means upon which the latter is adapted to swing.

5. A counterbalanced supporting mechanism, comprising a supporting part, an object supporting device movable upon said supporting part to different positions, counterbalancing means including a resilient element connected with the supporting device for movement thereby in a direction to effect tensioning of said element, a flexible connection between the supporting part and the counterbalancing means including a pivotal member adjacent the counterbalancing means, said connection operating to change the angular relationship of the supporting device and the counterbalancing means when the latter is moved by the supporting device, and means for arresting movement of the connection and the pivotal member during movement of the object supporting device to a predetermined position, the pivotal member when arrested serving as a pivotal support for the counterbalancing means on which it is adapted to swing upon movement of the supporting device in advance of said predetermined position.

6. A counterbalanced object supporting mechanism, comprising a supporting part, an object supporting device connected with said part for movement to different positions, spring means for counterbalancing the object connected with the supporting device for tensioning thereby upon movement of said device to predetermined positions, a holding device for the spring means, a flexible connection between the supporting part and the holding device comprising a series of pivotally connected members, and means for causing said members to progressively swing about their points of connection to vary the tension of the spring means when moving the object supporting device to said predetermined positions.

7. A counterbalanced supporting mechanism, comprising a supporting part, an object supporting device movable upon said part to different positions, counterbalancing means including a resilient element, a tensioning member for said element connected with said supporting device for operation thereby, a flexible connection between the supporting part and the counterbalancing means including a pivot member, and a cam on which said connection is adapted to move during movement of the supporting device whereby the counterbalancing means is moved to different angular positions with respect to said device, said supporting part having means for arresting the movement of the pivot member at a predetermined position of the supporting device, the counterbalancing means being swung about the axis of the pivot member upon movement of the supporting device in advance of said predetermined position.

8. A counterbalanced supporting mechanism, comprising a supporting part, an object supporting device, counterbalancing means including a resilient element, a holder for said element, a tensioning member for the resilient element connected with the supporting device for operation thereby, a cam associated with said supporting part, a pivotal support for the holder, and a flexible connection between said pivotal support and the supporting part comprising a plurality of pivotally connected members adapted to progressively engage the cam and caused by the latter to swing one upon another during movement of the supporting device to a predetermined position, said supporting part having a stop for arresting the movement of the pivotal support when the supporting device is moved to said predetermined position, the holder for the resilient element being adapted to swing upon the pivotal support when the latter is held by the stop on moving the supporting device in advance of said predetermined position.

9. A counterbalanced supporting mechanism, comprising a supporting part, a supporting device movable upon said part to different positions, counterbalancing mechanism interposed between said part and the supporting device, an X-ray apparatus, a bearing on the supporting device, a rotary support for the X-ray apparatus journaled in the bearing, and electric circuit connections for the X-ray apparatus including contact members engaging the rotary support in the different positions thereof.

10. A counterbalanced supporting mechanism, comprising a supporting part, a supporting device movable upon said part to different positions, counterbalancing means interposed between said part and the supporting device for operation by the latter upon movement thereof, an X-ray apparatus, a rotary support for the X-ray apparatus journaled upon the supporting device, electric circuit connections leading from the X-ray apparatus to the rotary support and connected therewith, circuit wires leading to the rotary support, contacts with which said wires are connected engaging the rotary support in the different positions thereof and connected therethrough with the circuit connections leading from the X-ray apparatus, and means on the rotary support serving to insulate said contacts one from another.

11. A counterbalanced supporting mechanism, comprising relatively movable parts, a bearing on one of said parts, an X-ray apparatus, a tubular support for the X-ray apparatus journaled in said bearing whereby the X-ray apparatus may be rotated to different positions of adjustment, contacts engaging the tubular support in the different positions of adjustment of the X-ray apparatus, electric circuit connections leading from the X-ray apparatus into the tubular support and connected with said contacts, and means on the tubular support serving to insulate the contacts one from another.

12. A counterbalanced supporting mechanism, comprising a supporting part, an object supporting device movable upon said part to different positions, counterbalancing means including a resilient element and relatively movable tensioning parts therefor one of which is connected with said supporting device and moved thereby during movement thereof, and means mounted independently of the supporting device and operating automatically to move one of said relatively movable tensioning parts during movement of the object supporting device whereby to vary the tension of the resilient element in proportion to the torque of the object supporting device in the different positions thereof.

13. A counterbalanced supporting mechanism, comprising a supporting part, an object supporting device movable upon said part to different positions, resilient counterbalancing means including relatively movable tensioning parts one connected with said supporting device for operation by movement of the latter, and means associated with said supporting part and engaging one of said tensioning parts and cooperating with the latter upon movement of the supporting device to shift the counterbalancing means transversely of the direction in which the tensioning force is applied to increase the tension of the resilient counterbalancing means whereby to compensate for the varying torque of said supporting device in the different positions thereof.

14. A counterbalanced mechanism, comprising a supporting part and a part movable thereon to different operating positions, counterbalancing mechanism including a resilient element, and relatively movable tensioning parts therefor engaging opposite ends thereof, one of said tensioning parts being connected with the part movable on the supporting part for movement thereby in one direction, a flexible element having one end connected with one of said tensioning parts and its opposite end connected with said supporting part, and a cam associated with the supporting part and adapted to cooperate with the flexible element to cause it to move the tensioning part with which it is connected in a direction opposite to that in which the other tensioning part is moved during operation of said movable part.

15. A counterbalanced supporting mechanism, comprising connected relatively movable supporting members one mounted to swing relative to another in a predetermined direction, counterbalancing mechanism including resilient means and tensioning means therefor connected with said swingingly mounted member and moved thereby when said member is moved in said predetermined direction, a flexible connection having one end attached to one of said supporting members and the other end attached to said tensioning means, and means associated with one of the supporting members and operating upon the flexible connection to automatically move the latter during movement of the swingingly mounted supporting member in said predetermined direction to increase the tension on said resilient means.

16. A counterbalanced supporting mechanism, comprising relatively movable supporting members one mounted to swing relative to another in a predetermined direction, counterbalancing mechanism including resilient means and tensioning means therefor connected with said swingingly mounted member for operation thereby, and a connection between one of said supporting members and said tensioning means including a pivot member on the latter, the connection adapted to swing with the counterbalancing means when it is moved in said predetermined direction, one of the supporting members having a part adapted to arrest movement of the pivot member at a predetermined position of the tensioning means from which position said tensioning means is adapted to swing on said pivot member upon continued movement of the swingingly mounted supporting member in said predetermined direction.

17. A counterbalanced supporting mechanism, comprising connected relatively movable supporting members, counterbalancing mechanism interposed between said members including resilient means and relatively movable tensioning parts therefor, one of said parts operated by one of said members upon moving the latter in a predetermined direction whereby to tension said resilient means, and a device associated with one of the supporting members and relative to which one of the tensioning parts is movable, said device cooperating with said last mentioned part to increase the tension on the resilient means when one of the supporting members is moved in one direction relative to another.

18. A counterbalanced supporting mechanism, comprising connected relatively movable supporting members, counterbalancing mechanism connected with said members including resilient means and relatively movable telescoping parts for tensioning said resilient means, one of the parts operated by one of said supporting members upon moving said members one relative to another, and means associated with one of said supporting members operating automatically upon one of the tensioning parts to increase the tension on the resilient means when one of the supporting members is moved in one direction relative to another.

19. A counterbalanced supporting mechanism, comprising a supporting part, an object supporting device movable on said part to different positions, counterbalancing means connected with the supporting device including resilient means and operating means for tensioning the resilient means connected with and moved by the object supporting device upon movement of the latter in one direction, and additional means mounted independently of the object supporting device and operating automatically during operation of the object supporting device to move the operating means relative to the object supporting device whereby to increase the tension on the resilient means in proportion to the torque of the object supporting device in the different positions thereof.

20. A counterbalanced supporting mechanism, comprising a supporting part, an object supporting arm adapted to swing upon said part to different positions, counterbalancing means extending longitudinally of said arm including resilient means and devices for tensioning the resilient means, one connected with the object supporting arm and another with said supporting part, said devices operating upon moving the arm in one direction to tension said resilient means, and additional means operating automatically upon one of said devices during movement of the arm in said direction to increase the tension on said resilient means.

21. A counterbalanced supporting mechanism, comprising a supporting part, object supporting means mounted to swing upon said part to different positions, counterbalancing means associated with the object supporting means comprising resilient means and relatively movable operating devices for the resilient means one actuated by the supporting means during movement thereof in one direction, one of said operating devices comprising a flexible element connected with said supporting part and including a plurality of pivotally connected members, and means associated with said supporting part operating to cause said members to progressively pivot one upon another during movement of the supporting means in said direction whereby to increase the tension on the resilient means.

22. A counterbalanced supporting mechanism, comprising a supporting part, an object supporting device adapted to swing upon said part, counterbalancing means comprising resilient means and operating devices for tensioning the resilient means one connected with the supporting device for operation thereby when moving the latter in one direction, a connection extending between another of said operating devices and said supporting part, and means associated with the supporting part and operating upon the connection during movement of the supporting device in one direction to move the last mentioned operating device to increase the tension on the resilient means.

23. A counterbalanced mechanism comprising a supporting part, a supporting device movable on said part in one direction to different operating positions, counterbalancing means comprising a resilient element and tensioning devices therefor engaging opposite portions of the resilient element and movable in opposite directions to move said portions each toward the other, one of said tensioning devices connected with the supporting device for movement thereby in one direction when the supporting device is moved to one of said operating positions, and means associated with said supporting part and operating automatically to move another of said tensioning devices in an opposite direction upon movement of the supporting device to said last mentioned operating position.

24. A counterbalanced supporting mechanism comprising a supporting part, an object supporting device movable upon said part, counterbalancing means including a resilient element and relatively movable tensioning parts therefor one of which is connected with the object supporting device for movement thereby, and means interposed between another of said tensioning parts and said supporting part, the latter having means associated therewith cooperating with said last mentioned means when moving the supporting device in one direction to operate the last mentioned tensioning part whereby to increase the tension on said resilient element.

25. A counterbalanced supporting mechanism, comprising a base, extensible linkage mechanism connected with the base including a pair of link-like elements, a support pivotally connected with the outer ends of said elements for movement relative thereto upon extension of said linkage mechanism, means interposed between the support and one of said elements for locking the support and said elements against relative movement, an object supporting device movable on said support to different positions, counterbalancing means connected with the supporting device including resilient means and operating means for tensioning the resilient means actuated by the object supporting device upon movement of the latter in one direction, and additional means operating automatically during operation of the object supporting device to move the operating means relative to the object supporting device whereby to increase the tension on the resilient means in proportion to the torque of the object supporting device in the different positions thereof.

26. A counterbalancing mechanism comprising supporting means, an object supporting arm mounted to swing on said supporting means, springs disposed at opposite sides of said arm, inner and outer tensioning members for each spring movable in opposite directions, said outer tensioning members being pivotally connected to said arm for operation thereby when swinging the arm in a predetermined direction, and connecting means between the supporting means and said inner tensioning members, said supporting means having a part associated therewith and cooperating with the connecting means to automatically move the inner tensioning members when swinging the arm in said predetermined direction whereby to increase the tension on the springs.

27. A counterbalancing mechanism comprising supporting means, an object supporting device adapted to swing on said supporting means, counterbalancing mechanism including resilient elements disposed at opposite sides of said object supporting device, a pair of operating devices for tensioning each of said resilient elements, the operating devices of each pair being movable in opposite directions and one of the operating devices of each pair being connected with said supporting device for movement thereby upon swinging said device in a predetermined direction, flexible means extending between and connected with said supporting means and the other operating devices of said pairs, said supporting means having cam means associated therewith and operating upon said flexible means during movement of the object supporting device in said predetermined direction to actuate the last mentioned operating devices whereby to increase the tension on the resilient elements.

ALPHONSE F. PIEPER.